United States Patent [11] 3,611,203

[72] Inventors Herbert W. Cooper
Hyattsville;
Robert A. Moore, Severna Park, both of Md.
[21] Appl. No. 816,723
[22] Filed Apr. 16, 1969
[45] Patented Oct. 5, 1971
[73] Assignee Westinghouse Electric Corporation
Pittsburgh, Pa.

[54] INTEGRATED DIGITAL TRANSDUCER FOR VARIABLE MICROWAVE DELAY LINE
4 Claims, 9 Drawing Figs.

[52] U.S. Cl. ........ 333/30
[51] Int. Cl. ........ H03h 9/30
[50] Field of Search ........ 333/30, 72, 6; 250/211; 310/8.2, 9.5

[56] References Cited
UNITED STATES PATENTS

| | | | |
|---|---|---|---|
| 3,289,114 | 11/1966 | Rowen | 333/30 |
| 3,360,749 | 12/1967 | Sittig | 333/72 |
| 3,446,974 | 5/1969 | Seiwatz | 250/211 |
| 3,479,572 | 11/1969 | Pokorny | 317/235 |
| 3,283,264 | 11/1966 | Papadakis | 333/6 |
| 3,378,793 | 4/1968 | Mortley | 333/30 |

OTHER REFERENCES
C. Tseug " Elastic Surface Waves" Journal of Applied Physics Vol. 38, Oct. 1967, pp. 4281-4283

*Primary Examiner*—Herman Karl Saalbach
*Assistant Examiner*—C. Baraff
*Attorneys*—F. H. Henson and E. P. Klipfel

ABSTRACT: The storage of digital, multiple-tap, variable delay pulse compression and coding is carried out directly at microwave frequencies. Nondispersive acoustical delay crystals are employed with surface wave acoustical grating transducers having a periodic equivalent to an acoustic wavelength. An arrangement employing a plurality of channels is disclosed. In another arrangement, a series of aligned transducers is used to obtain variable delays.

INTEGRATED DIGITAL TRANSDUCER FOR VARIABLE MICROWAVE DELAY LINE

DESCRIPTION OF THE PREFERRED EMBODIMENTS

Although delay lines may be fabricated in any length, a major inconvenience is the lack of access to the energy information during transit along the delay line, and the consequent inability to obtain arbitrary delay times as by tapping. In conventional structures the energy is available only at the two ends of the delay line, corresponding to quarter to perhaps several microsecond intervals. Modern processing techniques, however, demand intervals no greater than a few nanoseconds.

In accordance with the present invention, these and other disadvantages of prior art constructions are overcome by utilizing acoustical grating transducers having a periodicity equivalent to an acoustic wavelength for surface wave propagation. Tapping at one or more points along the surface of the crystal by duplicate grating transducers provides a variable delay. To this end photoetched transducing electrodes provide periodic array source transduction of body waves and direct coupling to surface waves. An interdigital transducer structure deposited on the crystal surface generates surface acoustic waves, such waves being constrained to propagate along the surface. Other such interdigital transducers are placed at one or more points on the crystal surface, in the path of the acoustic surface wave energy, to transduce a portion of that energy and, in effect, provide one or more taps in the delay line.

For a better understanding of the invention, reference should be made to the following description taken in connection with the accompanying drawings. In the drawings:

FIGS. 1A and 1B are diagrammatic illustrations of typical prior art delay lines which employ shear and compressional transducers.

FIG. 2 schematically illustrates a fragmentary section of the surface of an acoustic crystal provided with an interdigital transducer having a periodicity equivalent to an acoustic wavelength for generating surface acoustic waves.

Figures 2, 3, 4, 5, 6A, 6B, 6C:
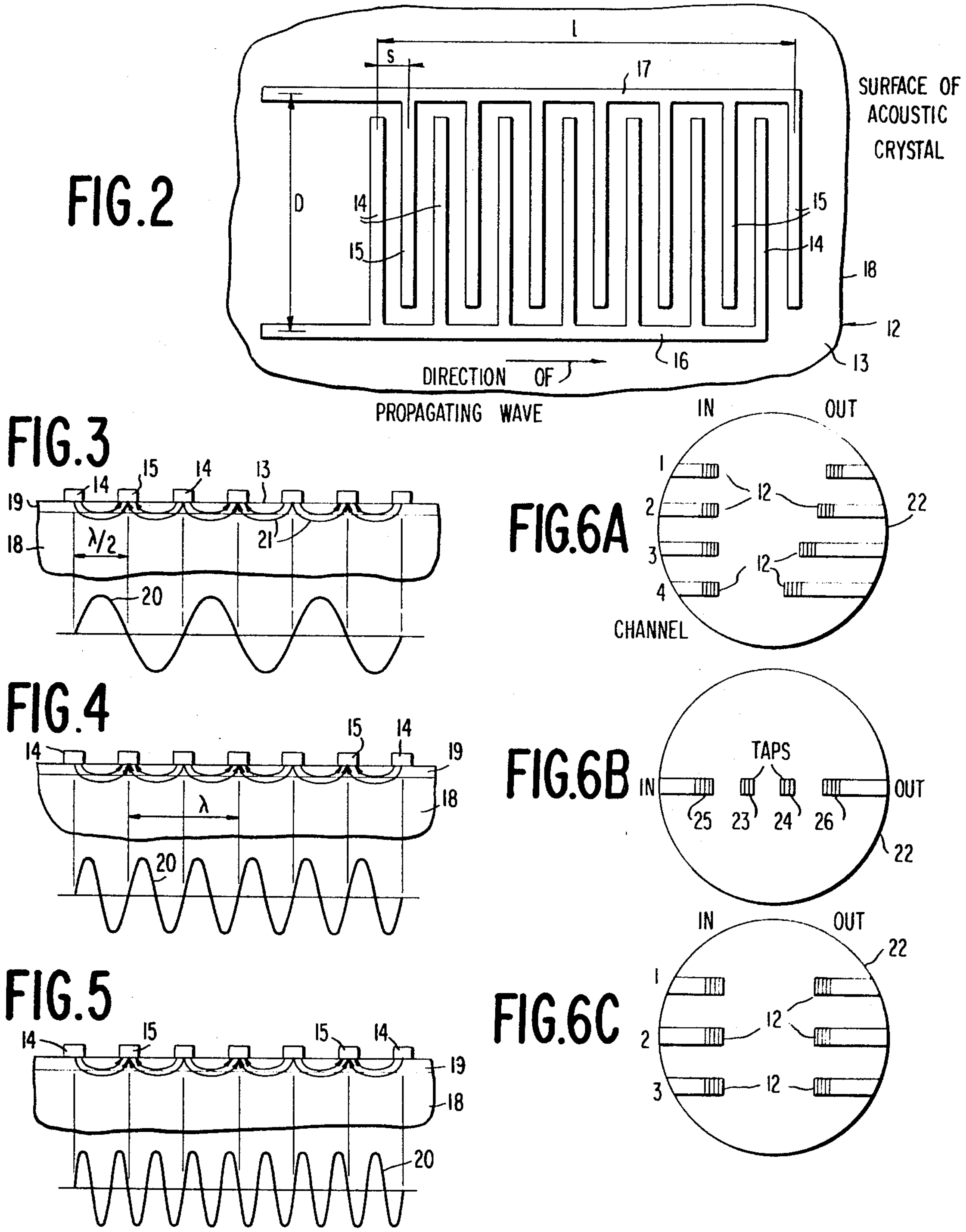
FIG. 3 illustrates a fragmentary cross-sectional view of an interdigital structure of FIG. 2 showing the fringing field between electrodes of the interdigital structure.
FIG. 4 illustrates the interaction of the phase of the acoustic wave per digit for the second harmonic.
FIG. 5 illustrates the interaction of the phase of the acoustic wave per digit for the third harmonic.

FIGS. 6A, 6B, and 6C illustrate typical geometries for digital variable delay lines, tapped delay lines and multiple-function channel delay lines using the interdigital transducer of FIG. 2.

Figures 1A, 1B:
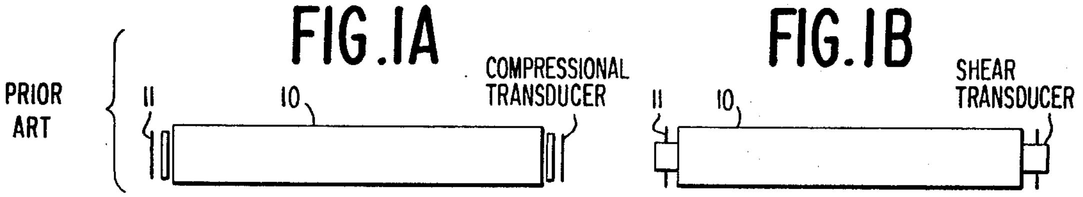

Referring now to the drawings and in particular to FIGS. 1A and 1B, there are illustrated two conventional forms of delay line, for shear and for compressional operation. The delay crystal is in the form of a rod or slab 10 with a transducer 11 on each end. Delay is achieved by virtue of the required propagation time along the crystal and is approximately 5 microseconds per inch through the body of the crystal. Although the length of such delay lines can be varied, such delay lines suffer from the inability to provide tapping between their ends.

In accordance with the present invention, an interdigital transducer 12, shown schematically and enlarged in FIG. 2, has a periodicity equivalent to an acoustic wavelength and generates surface acoustic waves along the surface 13 of the acoustic crystal 18. The electrode arrangement of the transducer for coupling to and from the field within the crystal comprises a plurality of digits or fingers 14, 15 which are positioned at spaced intervals on the surface 13 at right angles to the direction of propagation of the acoustic wave and arranged in an interdigital array. One end of each finger 14 is connected in common to a conductive strip 16. The opposite ends of each finger 15 are connected in common to conductive strip 17. The ends of strips 16 and 17 are in turn connected to a microwave circuit to apply or extract energy as the case may be.

Well-known techniques are utilized to deposit the interdigital transducer structure on the crystal. Typically, metal evaporation may be used, with the pattern being generated by photoengraving. Conductor widths to finer that $10^{14}$ inches may be realized with such techniques. This resolution is important since the center-to-center distance $s$ between adjacent conductor fingers 14, 15 must be no greater than one-half the acoustic wavelength in the crystal. Electron beam techniques can be used to achieve still greater resolution. Typical metals which can be employed for the conductive finger and strip elements are gold, chromium, aluminum, silver.

Much like an optical grating, the acoustical grating transducer 12 interacts coherently across the phase front of the acoustical wave in the crystal. A tight degree of coupling results, provided that the grating and acoustical waves are in phase synchronism. Both surface and bulk waves (normal to the surface) can be generated. An acoustic wave propagates in a well-defined manner according to the surface boundary conditions and arises by virtue of the piezoelectric effect. Although the transducer 12 of FIG. 2 can generate both surface waves and bulk waves, only the surface waves are vital to the practice of the invention. Characteristic of surface waves is an energy extend beneath the surface of the order of a wavelength. By contrast, the bulk waves propagate through the material.

A surface wave will either be generated or detected along the surface 13 of the crystal by the interdigital structure, so long as the interdigital transducer has a periodicity equivalent to an acoustic wave. Referring to FIG. 3, a fragmentary enlarged cross section of the interdigital and crystal structure illustrates the manner in which a surface wave is generated by the fringing fields between the metal fingers 14, 15. The fingers are deposited directly on surface 13 of the acoustic crystal 18 or on a piezoelectric film 19 which may be placed between the crystal 18 and the fingers. Typically, cadmium sulfide or zinc oxide may be the film material. Such a film is, however, not an absolute requisite for the practice of the invention.

Assume now an already generated surface wave passing along the surface of the crystal. The phase of such a wave 20 is illustrated schematically in FIG. 3. As the surface wave passes fingers 14 and 15, strains are set up in a portion of the piezoelectric 18 and the film 19, adjacent the electrodes 14, 15 causing an electric fringe field to form. The fringe field between fingers is illustrated in FIG. 3 by lines 21. The lower curve 20 represents schematically the phase per digit or finger of the acoustic wave and is the fundamental or first harmonic. Coupling can only occur for odd harmonics.

Referring to FIGS. 4 and 5, the phase per digit of the acoustic wave 20 is shown for the second and third harmonics. It can be seen from FIG. 4 that the even harmonics have an opposite interaction between adjacent fingers 14 and 15 causing a cancellation effect, while in FIG. 5 the third harmonic is shown to have a net positive interaction per digit.

The time resolution achievable is the propagation time past the resolving elements. This is because the electrodes of the transducing element are energized simultaneously, but the wave must also propagate past the structure acoustically. With known photoengraving techniques, a resolution of approximately 2 nanoseconds can be achieved from a sapphire crystal 18. The resolving time for a transducer fabricated with the same fabrication process using a quartz crystal is slightly higher. For a 10-microsecond delay, the resolving power or equivalent time bandwidth is $5\times(10)^3$. This is about two orders of magnitude greater than present passive techniques for which the maximum time bandwidth is approximately 100.

The interdigital transducer configuration shown in schematic form in FIG. 2 can be utilized on circular disc substrates of low-loss acoustic material such as sapphire to form a digital variable delay line, a multiple-function channel line or a tapped delay line. Although the disc substrates are normally fabricated with a 60° orientation, they can also be fabricated with an orientation normal to the C-axis needed for pure mode propagation. Maximum coupling to surface acoustic waves requires that the interdigital transducer periodicity be equal to an odd multiple of an acoustical wavelength as hereinbefore described. Thus, the electrode spacing, *s*, in the enlarged grating shown in FIG. 2, must equal $n(\lambda a12)$, where $n$ is any odd integer and $\lambda a$ is an acoustic surface wavelength.

FIG. 6A illustrates a multiple-channel delay line comprising four channels formed on disc 22 using the interdigital structure of transducer 12 shown in FIG. 2. Each channel has a variable delay controlled by the distance between the opposed transducer gratings.

FIG. 6B illustrates a tapped delay line wherein two interdigital transducer taps 23, 24 are disposed in the path of the acoustic beam between input and output transducers 25 and 26, respectively.

The variable delay and multiple-function channel lines shown in FIGS. 6A and 6C, respectively, maintain signal isolation through transducer directivity. The acoustic beam-spreading angle in radians is approximately $0.892\ \lambda a/D$, where $D$ is the width between conductors as shown in FIG. 2. Thus, the beam width, which emanates from a transducer with an aperture of 0.01 inch, is approximately 0.01 inch at a distance of 1 inch, a diameter typical of the substrates 22.

It should be noted that the finger electrodes connected to either of the transducer terminals have a periodicity or spacing, of an odd multiple of the acoustic wavelength, as illustrated in FIGS. 4 and 5. When these comblike electrodes are arranged in an interdigital array, the periodicity, or spacing, between adjacent finger electrodes, as illustrated in FIG. 2 by the symbol *s* is an odd multiple of a half-wavelength.

What is claimed is:

1. A delay line comprising a planar body of piezoelectric crystal material, a plurality of input acoustical grating transducers on the crystal surface for generating surface acoustical waves, a corresponding plurality of output acoustical grating transducers on the crystal surface, each of said output transducers being arranged in the path of the acoustic surface wave of only one of said input transducers thereby forming a plurality of independent channels, each of said acoustical grating transducers comprising a plurality of parallel conductive fingers spaced on said surface at intervals equal to substantially an odd multiple of a half-wavelength of the acoustic wave.

2. A delay line as set forth in claim 1 wherein the distance between input and output transducers for each channel is equal.

3. A delay line as set forth in claim 1 wherein the distance between input and output transducers of at least one channel is greater than the distance between input and output transducers of another channel.

4. A delay line comprising a planar body of piezoelectric crystal material, a plurality of input acoustical grating transducers on the crystal surface for generating surface acoustical waves, a corresponding plurality of output acoustical grating transducers on the crystal surface, each of said output transducers being arranged in the path of the acoustic surface wave of only one of said input transducers thereby forming a plurality of independent channels, each of said acoustical grating transducers comprising a plurality of finger electrodes arranged in an interdigital array with alternate electrodes connected, respectively, to one of a pair of terminals, the spacing between the electrodes connected to a respective terminal being substantially equal to an integral multiple of a wavelength of the acoustical wave whereby the spacing between adjacent electrodes of said array is equal to substantially an odd multiple of a half-wavelength of said acoustical wave, said electrodes being arranged perpendicular to the direction of propagation of the acoustic wave.